United States Patent [19]
Augstein et al.

[11] 3,852,291
[45] Dec. 3, 1974

[54] HETEROCYCLIC DERIVATIVES OF PHENOXYPROPANOLAMINES

[75] Inventors: Joachim Augstein, Woodhouse Eaves; David Alexander Cox, Canterbury; Allan Leslie Ham, Broadstairs, all of England

[73] Assignee: Pfizer Inc., New York, N.Y.

[22] Filed: Aug. 2, 1972

[21] Appl. No.: 277,159

[30] Foreign Application Priority Data
Aug. 4, 1971 Great Britain .................... 36606/71

[52] U.S. Cl.................. 260/256.4 C, 260/256.4 R, 260/256.4 H, 260/307 F, 260/309.5, 260/309.6, 260/309.7; 424/251, 424/272, 424/273

[51] Int. Cl.......................................... C07d 51/28
[58] Field of Search............ 260/256.4 C, 256.5 R, 260/256.5 H, 307 F, 309.5, 309.6, 309.7

[56] References Cited
UNITED STATES PATENTS

| | | | |
|---|---|---|---|
| 2,883,381 | 4/1959 | Schusteritz....................... | 260/247.5 |
| 3,679,681 | 7/1972 | Habermeier et al. ......... | 260/256.4 C |

*Primary Examiner*—G. Thomas Todd
*Attorney, Agent, or Firm*—Connolly and Hutz

[57] ABSTRACT

Novel propanolamine derivatives useful in the treatment of angina pectoris and pharmaceutical compositions thereof.

20 Claims, No Drawings

HETEROCYCLIC DERIVATIVES OF PHENOXYPROPANOLAMINES

BACKGROUND OF THE INVENTION

The invention relates to propanolamine derivatives having useful therapeutic properties It is particularly concerned with novel derivatives of 1-phenoxy- (or 1-phenylthio-) 3-alkyl-amino-propan-2-ols which are potent blockers of β-adrenergic receptors, and with a preferred class of such derivatives which exert a stronger inhibitory action on myocardial β-receptors, i.e., those affecting heart tissue, than on peripheral β-receptors, e.g., those affecting tracheal or bronchial tissue or vascular tissue. The compounds of the invention are, therefore, useful in the treatment of cardiac conditions such as angina pectoris and cardiac arrhythmias and in the treatment of hypertension, and the preferred class are particularly useful in that they may be used for the treatment of cardiac conditions without adversely affecting lung conditions or blood pressure in susceptible patients.

SUMMARY OF THE INVENTION

The compounds of the present invention have the general formula:-

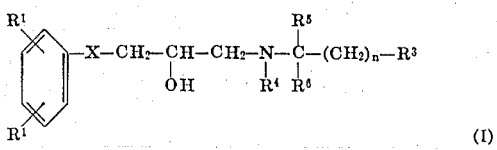

where
- $R^1$ is a hydrogen atom or a carboxamido group, which may be separated from the phenyl ring by a methylene or ethylene group;
- $R^2$ is a hydrogen or halogen atom, or a lower alkyl, alkoxy, alkenyl or alkenoxy group;
- $R^3$ is an at least partially hydrogenated imidazolyl or pyrimidinyl group linked to the remainder of the molecule by one of its nitrogen atoms and having a ring oxo or thio substituent adjacent to that nitrogen atom and optionally a second oxo or thio substituent adjacent to a nitrogen atom and/or one or more lower alkyl substituents;
- $R^4$ is a hydrogen atom, a lower alkyl or alkanoyl group or a benzyl group;
- $R^5$ and $R^6$ are each a hydrogen atom or a lower alkyl group; X is an oxygen or a sulphur atom; and
- $n$ is 1 to 3.

Also in accordance with the invention are the condensation products of those compounds of the formula (I) in which $R^4$ is a hydrogen atom with formaldehyde or an aliphatic aldehyde containing up to 5 carbon atoms, the esters of compounds of the formula (I) in which the 2-hydroxy group is esterified with a lower alkanoic acid, and the pharmaceutically-acceptable acid addition salts of compounds of the formula (I), other than those wherein $R^4$ is a lower alkanoyl group, and of the said esters and aldehyde condensation products.

DETAILED DESCRIPTION OF THE INVENTION

In this specification the term "carboxamido" means a group $-NR^7R^8$, in which $R^7$ is a carboxylic acid radical and $R^8$ is a hydrogen atom or a lower alkyl group, or $R^7$ and $R^8$ together with the nitrogen form a cyclic imido group. The carboxylic acid radical may be, for example, a formyl, acetyl, propionyl, acryloyl, cyclohexane carbonyl, benzoyl, furoyl or phenylacetyl radical, or substituted derivatives thereof such as chloroacetyl, tri-fluoracetyl, glycolyl, phenoxy-acetyl, toluoyl, nitrobenzoyl or chlorobenzoyl. A cyclic imido group may be derived from an aliphatic or aromatic dicarboxylic acid, and may therefore be, for example, a succinimido, maleimido or phthalimido group.

Also in this specification, the term "halogen" means fluorine, chlorine, bromine or iodine; the term "lower" when qualifying an alkyl, alkenyl, alkoxy, alkenoxy or alkanoyl group means that such group contains not more than four carbon atoms.

The group $R^3$ is an imidazolinyl, imidazolidinyl or di-, tetra or hexa-hydropyrimidinyl group having either one or two ring oxo or thio substituents adjacent to a nitrogen atom therein and optionally one or more lower alkyl substituents. For example, it may be any of the following groups, some of which are radicals derived from well-known bases, as shown in parenthesis after the radical:

5-oxo-2-imidazolin-1-yl;
2-oxo-imidazolidin-1-yl;
2-thio-imidazolidin-1-yl;
2,4-dioxo-imidazolidin-1-yl (hydantoin);
1,2-dihydro-2-oxo-pyrimidin-1-yl;
1,2,3,4-tetrahydro-2,4-dioxo-pyrimidin-1-yl (uracil);
1,2,3,4-tetrahydro-2,4-dioxo-pyrimidin-3-yl (uracil);

or lower alkyl derivatives thereof, including the following:

1,2,3,4-tetrahydro-5-methyl-2,4-dioxo-pyrimidin-1-yl (thymine);
1,2,3,4-tetrahydro-5-methyl-2,4-dioxo-pyrimidin-3-yl (thymine);
1,2,3,4-tetrahydro-3,5-dimethyl-2,4-dioxo-pyrimidin-1-yl.

Aldehyde condensation products of compounds of the formula (I) are oxazolidines having the formula:-

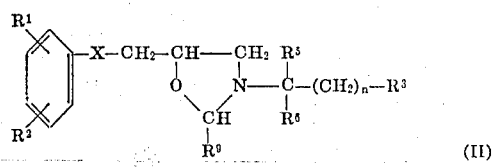

where $R^9$ is a hydrogen atom or a lower alkyl group, which are formed by the condensation of compounds of the formula (I), in which $R^4$ is a hydrogen atom, with formaldehyde or an aliphatic aldehyde $R^9CHO$ containing up to 5 carbon atoms.

Acids from which pharmaceutically-acceptable addition salts of the compounds of the invention can be prepared are those which form non-toxic addition salts containing pharmaceutically-acceptable anions, such as the hydrochloride, hydrobromide, hydroiodide, sulphate or bisulphate, phosphate or acid phosphate, acetate, maleate, fumarate, lactate, tartrate, citrate, gluconate, saccharate and p-toluene sulphonate salts.

Preferred classes of compounds of the invention are those in which X is an oxygen atom, those in which $R^1$ is either a hydrogen atom or a lower alkanoylamino (e.g. acetamido) group directly attached to the phenyl ring, those in which $R^6$ is a hydrogen atom and $R^5$ is either a hydrogen atom or a methyl group, and those in which n is 1.

One particularly preferred class of compounds comprises those compounds of the formula (I) in which $R^3$ is a 1,2,3,4-tetrahydro-2, 4-dioxo-pyrimidin-1-yl group substituted at the 5-position with a lower alkyl group, especially a methyl group. Another particularly preferred class comprises those compounds of the formula (I) in which $R^1$ is a hydrogen atom or a 4-acetamido group and $R^2$ is a hydrogen atom or a 2-methyl group.

The compounds of the invention can be administered alone, but will generally be administered in admixture with a pharmaceutical carrier selected with regard to the intended route of administration and standard pharmaceutical practice. For example, they may be administered orally in the form of tablets containing such excipients as starch or lactose, or in capsules either alone or in admixture with excipients, or in the form of elixirs or suspensions containing flavoring or coloring agents. They may be injected parenterally, for example, intramuscularly or subcutaneously. For parenteral administration, they are best used in the form of a sterile aqueous solution which may contain other solutes, for example, enough salts or glucose to make the solution isotonic.

For administration to man in the treatment of cardiac conditions such as angina pectoris, it is expected that oral dosages of the most active compounds of the invention will be in the range from 0.5 to 10 mg/kg/day, given in 3 or 4 divided doses per day, and that dosages for intravenous administration will be about one-tenth of these in a single dose per day. Thus, for a typical adult patient (70 kg), individual tablets or capsules might contain from 10 to 250 mg of active compound, and intravenous dosages from 1 to 50 mg, in a suitable vehicle or carrier. The physician in any event will determine the actual dosage which will be most suitable for an individual patient and it will vary with age, the weight and response of the particular patient. The above dosages are exemplary of the average host. There can, of course, be individual cases where higher or lower dosage ranges are merited, and such are within the scope of this invention.

The compounds of the invention may be prepared in a number of ways:
1. An epoxy compound of the formula:

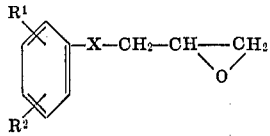

is reacted with an amine of the formula:

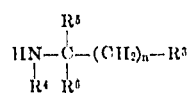

(provided that $R^4$ is not a lower alkanoyl group) in equimolecular proportions or optionally in the presence of excess amine when $R^4$ is a hydrogen atom. The reaction may be carried out at ambient or elevated temperature in a suitable solvent, e.g., methanol or ethanol, and the crude product is recovered by filtration or evaporation of the solution to dryness. The product may then be purified by crystallisation from a suitable solvent to yield the free base, or by dissolution in a solvent and precipitation as a suitable salt, e.g. the hydrochloride, fumarate, maleate or oxalate, by addition of the appropriate acid followed by collection of the precipitated salt by filtration and recrystallisation from a suitable solvent. Alternatively, in some cases when the crude salt has been prepared, this may be rebasified by suspension in a suitable basic medium, e.g. aqueous sodium bi-carbonate solution, and the resultant free base collected by filtration and recrystallised to purity.

2. An amine of the formula:

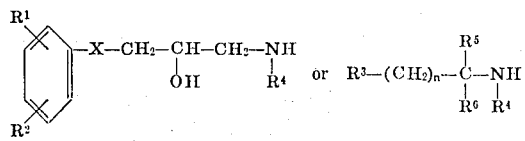

(provided that in each case $R^4$ is not a lower alkanoyl group) is reacted with a compound of the formula:

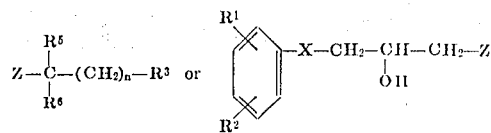

, respectively where Z is a halogen atom or other suitable "leaving" group, e.g. an aryl sulphonyloxy group, by heating either optionally in the presence of excess amine in a suitable solvent, e.g. methanol or ethanol, or in equimolar proportions in the absence of a solvent, or in the presence of a base, e.g. sodium bicarbonate, and a suitable solvent as before. The crude product is recovered either by filtration or evaporation of the filtrate to dryness or in some cases by suspending the solid in a suitable medium, e.g. aqueous sodium bicarbonate solution, and collecting the precipitate. Purification may then be effected as in method (1).

3. Those compounds of the invention in which $R^4$ is a hydrogen atom may also be prepared from those in which $R^4$ is a benzyl group by hydrogenation under suitable conditions so as to remove the benzyl group, e.g. using a palladium on charcoal catalyst with the free base or salt dissolved in a suitable solvent, e.g. aqueous acetic acid solution, the hydrogenation being carried out at ambient temperature and at low pressure, e.g. 15 p.s.i. The product may then be recovered by filtration of the reaction solution to remove the catalyst, evaporation of the filtrate to dryness and purification as in method (1).

4. Those compounds of the invention in which $R^4$ and $R^6$ are each a hydrogen atom may also be prepared by reacting an amine of the formula:

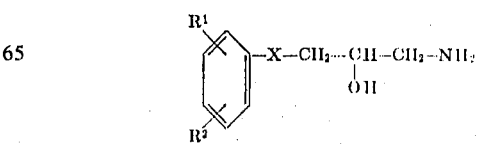

with an aldehyde or ketone of the formula:

$$R^3-(CH_2)_n-CO.R^5$$

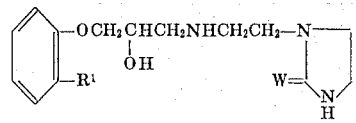

| Example | R¹ | W | Salt m.p. °C | Analysis % (Theoretical in brackets) | | |
|---------|-----|---|--------------|------|------|------|
|         |     |   |              | C | H | N |
| II | H | 0 | oxalate 152–4° | 51.4 (52.0 | 6.3 6.3 | 11.7 11.4) |
| III | CH₃ | S | hydrochloride 200–201° | 52.4 (52.1 | 7.05 7.0 | 12.4 12.2) | to give the corresponding Schiff's base, which is then hydrogenated in the presence of a catalyst, e.g. platinum, or reduced with sodium borohydride. The product is recovered by filtration to remove catalyst or solid reactants, evaporation of the filtrate in vacuo and purification as in method (1).

The aldehyde condensation products of compounds of the formula (1) in which $R^4$ is a hydrogen atom may be prepared by reaction with formaldehyde or the appropriate aldehyde $R^9CHO$ in a diluent or solvent, e.g. ethanol, preferably in the presence of an acid catalyst, e.g. hydrochloric acid or acetic acid, and preferably at an elevated temperature. The water formed in the reaction may be removed by azeotropic distillation by means of an entraining solvent, e.g. benzene, or by treating with a dehydrating agent, e.g. anhydrous potassium carbonate.

Esters of compounds of the formula (I), as well as compounds of the formula (I) in which $R^4$ is lower alkanoyl, may be prepared by acylation of the free hydroxyl group or the secondary amino group respectively, in conventional ways with the appropriate acid chloride or anhydride.

The invention is illustrated but not limited by the following Examples in which all temperatures are given in °C.

EXAMPLE I 3-(2-Methylphenoxy)-1.2-epoxypropane (6.4 g) and 1-(2-aminoethyl)-2-imidazolidone (5.0 g) were dissolved in ethanol (50 ml) and left to stand for 16 hours. The solution was evaporated to dryness in vacuo and the oily residue was redissolved in diethyl ether containing a small quantity of ethanol. Ethereal oxalic acid was added to precipitate the oxalate of the product which was then partially purified by recrystallisation from ethanol. The oxalate (4.0 g) was dissolved in water and rebasified with sodium bicarbonate to give the free base of the product. Recrystallisation from ethyl acetate yielded pure 1-[2-(3-{-2-methylphenoxy} -2-hydroxypropylamino)ethyl]-2-imidazolidone as white crystals (1.1 g), m.p. 102°–5°.
Analysis:
Found: C, 61.6; H, 7.9; N, 14.3%
Required for $C_{15}H_{23}N_3O_3$: C, 61.4; H, 7.9; N, 14.3%

EXAMPLES II and III

By methods similar to that of Example I, the compounds shown in the following Table were prepared from the appropriately substituted 3-phenoxy-1,2-epoxypropane and 1-(2-aminoethyl)-2-imidazolidone or -imidazolidin-2-thione and characterised as the salts indicated.

EXAMPLE IV

1(2-Benzylaminoethyl)thymine (29 g) and 3-(4-acetamido-2-methylphenoxy)-1,2-epoxypropane (22 g) were refluxed together in ethanol (1500 ml) for 20 hours and then left to stand for a further 16 hours at room temperature. The clear solution was evaporated to dryness in vacuo and the gummy residue was redissolved in ethyl acetate (200 ml) and excess oxalic acid in ethereal solution was added to precipitate the oxalate (58 g). Recrystallisation was effected by boiling a methanolic solution of the oxalate (1500 ml), filtering whilst hot to remove the insoluble material, and allowing the filtrate to cool. The pure oxalate of N-[3-(4-acetamido-2-methylphenoxy)-2-hydroxypropyl]-N-[2-(thymine-1-yl)ethyl]benzylamine crystallised out as a white crystalline solid (32 g), m.p. 164°–5°.

The previous product (32 g) dissolved in aqueous acetic acid solution (50%, 1100 ml) was hydrogenated over palladium on charcoal catalyst at 15 p.s.i. pressure and room temperature. The mixture was filtered and the filtrate evaporated to dryness in vacuo and the residue was recrystallised from methanol and then from water to give the oxalate monohydrate of 1-[2-(3 4-acetamido-2-methylphenoxy -2-hydroxypropylamino)ethyl]thymine as white crystals (13 g), m.p. 210°–212°.
Analysis:-
Found: C, 50.6; H, 6.2; N, 11.6%
Required for $C_{19}H_{26}N_4O_5.C_2H_2O_4.H_2O$: C, 50.6; H, 6.1; N, 11.2%

EXAMPLE V

By a method similar to that of Example IV, using 1-(2-benzylaminoethyl)-2-imidazolidone and 3-(4-acetamidophenoxy)-1,2epoxypropane in place of 1-(2-benzylaminoethyl)thymine and 3-(4-acetamido-2-methylphenoxy)-1,2-epoxypropane, respectively, as starting materials, 1-[2-(3 4-acetamidophenoxy -2-hydroxypropylamino)ethyl]-2-imidazolidone was produced and isolated as the oxalate salt, m.p. 195°–7°.
Analysis:
Found: C, 50.2; H, 6.2; N, 12.9%
Required for $C_{16}H_{24}N_4O_4.C_2H_2O_4$: C, 50.7; H, 6.2; N, 13.1%

EXAMPLES VI to XVII

By methods similar to that of Example IV, the following compounds were prepared by reacting together the appropriately substituted 1-(benzylaminoethyl)uracil and the appropriately substituted 3-phenoxy-1,2-epoxypropane, and then debenzylating the product. Both the intermediate N-benzyl compound and the final product in each case are compounds of the invention, the debenzylated final product being characterised as the salt indicated.

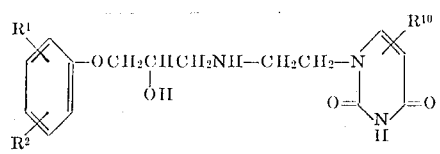

| Example | R¹ | R² | R¹⁰ | Salt M.P., °C. | C | H | N |
|---|---|---|---|---|---|---|---|
| VI | 4-CH₃CONH | 2-CH₃ | H | Hydrochloride sesquihydrate, 205-9° | 50.1 (50.1) | 6.0 (6.2) | 13.5 (13.2) |
| VII | H | 2-CH₃ | 5-CH₃ | Hydrochloride, 211-2° | 55.2 (55.2) | 6.5 (6.5) | 11.4 (11.4) |
| VIII | H | 2-CH₃ | H | Hydrochloride, 220-4° | 54.3 (54.1) | 6.3 (6.2) | 11.7 (11.8) |
| IX | H | H | 5-CH₃ | Oxalate monohydrate, 159-161° | 50.7 (50.6) | 5.7 (5.9) | 10.6 (9.8) |
| X | 4-CH₃CONHCH₂ | H | 5-CH₃ | Oxalate hemihydrate, 145-150° | 51.4 (51.5) | 5.9 (6.0) | 11.3 (11.4) |
| XI | H | 3-CH₃ | 5-CH₃ | Oxalate, 158-160° (decomp.) | 53.5 (53.9) | 5.95 (5.95) | 9.95 (9.9) |
| XII | H | 2-CH₃O | 5-CH₃ | Acetate, 165-8° | 55.6 (55.7) | 6.6 (6.65) | 10.5 (10.3) |
| XIII | H | 2-CH₃ | 5-CH₃CH₂ | Acetate, 146-8° | 58.9 (58.95) | 7.3 (7.2) | 10.3 (10.3) |
| XIV | H | 2-CH₃ | 5-(CH₃)₂CH | Oxalate, 199-200° | 55.8 (55.9) | 6.5 (6.5) | 9.3 (9.3) |
| XV | 4-CH₃CONH | 2-CH₃ | 5-C₂H₅ | Acetate monohydrate, 168-170° | 55.2 (54.8) | 6.7 (7.1) | 11.9 (11.6) |
| XVI | 4-CH₃CONH | 2-CH₃ | 5-(CH₃)₂CH | Maleate, 115-125° | 55.8 (56.2) | 6.42 (6.4) | 10.1 (10.5) |
| XVII | H | 2-CH₃ | 6-CH₃ | Acetate, 107-9° | 58.01 (58.00) | 7.03 (6.92) | 10.79 (10.68) |

EXAMPLE XVIII

By the method similar to that of the first part of Example IV, N-[3-(2-chlorophenoxy)-2-hydroxypropyl]-N-[2-(thymine-1-yl)ethyl]-benzylamine, m.p. 115°-7°, was prepared from 1-(2-benzylaminoethyl)-thymine and 3-(2-chlorophenoxy)-1,2-epoxypropane.
Analysis
Found: C, 62.07; H, 5.92; N, 9.05%
Required for $C_{23}H_{26}ClN_3O_4$: C, 62.23; H, 5.91; N, 9.46%

EXAMPLE XIX 1-(2-Methylphenoxy)-3-benzylaminopropan-2-ol (11.8 g), 1-(3-bromopropyl)thymine (10.7 g) and sodium bicarbonate (3.7 g) were refluxed together in ethanol (250 ml) for 16 hours. The solution was filtered while still hot and the filtrate concentrated by evaporation in vacuo to a small bulk which was triturated in diethyl ether to precipitate the remaining sodium bromide. After the precipitate had been removed by filtration, the filtrate was evaporated in vacuo to afford an oily residue, the free base N-benzyl product, which was converted to the oxalate salt by conventional means. Recrystallisation from methanol yielded 4 g of N-[3-(2-methylphenoxy)-2-hydroxypropyl]-N-[3-(thymine-1-yl)propyl]benzylamine oxalate as white crystals, m.p. 167°-0°.
Analysis:-
Found: C, 60.9; H, 6.2; N, 7.8%
Required for $C_{25}H_{31}N_3O_4.C_2H_2O_4$: C, 61.5; H, 6.3; N, 8.0%

The previous product was hydrogenated according to the method described in the second part of Example IV to yield 1-[3-(3-{2-methylphenoxy}-2-hydroxypropylamino)propyl]thymine oxalate hemihydrate, m.p. 164°-6°.
Analysis:-
Found: C, 54.15; H, 6.2; N, 9.6%
Required for $C_{18}H_{25}N_3O_4.C_2H_2O_4.0.5H_2O$: C, 53.8; H, 6.3; N, 9.4%

EXAMPLES XX and XXI

By methods similar to that of Example XIX, the following compounds were prepared by reacting together the appropriate 1-(bromoalkyl)thymine and 1-(4-acetamido-2-methylphenoxy)-3-benzylaminopropan-2-ol, and then debenzylating the product. Both the intermediate N-benzyl compound and the final product in each case are compounds of the invention, the debenzylated final product being characterised as the salt indicated.

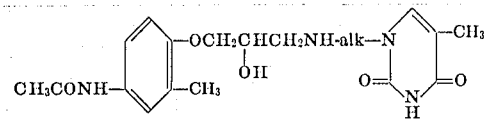

| Example | alk | Salt m.p. °C | C | H | N |
|---|---|---|---|---|---|
| XX | —CH₂CH₂CH₂— | oxalate hemihydrate 137-141° | 52.7 (52.5 | 6.0 6.2 | 11.0 11.1) |
| XXI | —CH₂CH₂CH₂CH₂— | oxalate sesquihydrate 133° (decomp.) | 51.3 (51.6 | 6.3 6.6 | 10.7 10.5) |

EXAMPLE XXII

A. A solution of 1-acetonylthymine (18.2 g) and benzylamine (10.7 g) in ethanol (250 ml) was refluxed for 1 hour, and then sodium borohydride (20 g) was added cautiously in small portions over a period of about 75 minutes with vigorous stirring. More ethanol was added periodically to keep the mixture mobile.

After the mixture had cooled to room temperature, water (150 ml) was added, and the whole was filtered to remove insoluble solids. The filtrate was partially evaporated in vacuo to remove ethanol, and the resulting concentrated aqueous solution was allowed to stand at room temperature. After a short time a solid A crystallised out and was filtered off and discarded subsequent to it being found to be insoluble in organic solvents and thus not a required product. Neutralisation of the filtrate by addition of concentrated hydrochloric acid resulted in the separation of a solid B and an oil C. To the mixture was added chloroform, and the whole was then filtered to remove the solid B which had not dissolved after the addition of chloroform. The chloroform layer was separated from the aqueous of the filtrate, dried over anhydrous magnesium sulphate and evaporated in vacuo to afford an oil D.

Trituration of the oil D in diethyl ether, into which most of the oil dissolved, eventually afforded a solid E. A seed of the latter was used to induce crystallisation from the ethereal solution retained from the trituration, yielding crystals F, which consisted of 8.5 g of 1-(2-benzylaminoropyl)thymine, m.p. 98°–100°.
Analysis:-
  Found: C, 64.8; H, 7.1; N, 15.2%
  Required for $C_{15}H_{19}N_3O_2$: C, 65.95; H, 7.0; N, 15.4%

(B) The product of (A) (5.7 g) and 1-(2-methylphenoxy)-2,3-epoxypropane (3.4 g) were dissolved in ethanol (100 ml) and the solution was refluxed for 24 hours, after which the solvent was removed by evaporation in vacuo and the resultant oil was treated with ethereal oxalic acid solution. The resulting precipitate was collected by filtration and recrystallised from isopropanol to afford a solid which was subsequently identified as the oxalate salt of the unchanged starting amine. Concentration of the recrystallisation filtrate and addition thereto of diethyl ether induced precipitation of a gummy solid, which was then collected by filtration and used directly, without purification, in the next and final stage.

(C) The product of (B) (8 g, assumed to be crude N-[3-(2-methylphenoxy)-2-hydroxypropyl]-N-[1-methyl-2-(thymine-1-yl)ethyl]-benzylamine) was hydrogenated in the presence of 5% palladium on charcoal catalyst (0.5 g) in 50% aqueous acetic acid solution at 15 p.s.i. pressure and at room temperature until the theoretical hydrogen uptake had been achieved after about 2 hours. After removal of catalyst by filtration, the filtrate was evaporated in vacuo to afford a gummy residue. The latter was 64.8; trituration in diethyl ether, and the solid G recrystallised twice from methanol, yielding 0.81 g of a solid, m.p. 185°–6°.
Analysis:-
  Found: C, 54.7; H, 6.2; N, 9.6%
  Required for $C_{18}H_{25}N_3O_4.C_2H_2O_4$: C, 54.95; H, 6.2; N, 9.6%

To the filtrate from the recrystallization of the solid G was added diethyl ether and the resultant solid precipitate was removed by filtration.

A further solid H crystallised from the filtrate, and this was collected by filtration and recrystallised from a mixture of methanol and diethyl ether to yield crystals. m.p. 151°–7°.
Analysis:-
  Found: C, 54.9; H, 6.35; N 9.3%
  Required for $C_{18}H_{25}N_3O_4.C_2H_2O_4$: C, 54.95; H, 6.2; N, 9.6%

Differences between the infra-red spectra and melting points of the solids G and H indicated that they probably comprise the opposite pairs of diastereoisomers of 1-[2-(3-{2-methylphenoxy}-2-hydroxypropylamino)propyl]thymine oxalate.

EXAMPLE XXIII

By the method similar to that of Example XXII and without attempting to separate the pairs of diastereoisomers, 1-[2-(3{4-acetamido-2-methylphenoxyl}-2-hydroxypropylamino)propyl]thymine oxalate hemihydrate, m.p. 144°–6°, was prepared starting from 1-acetonylthymine; benzylamine and 1-(4-acetamido-2-methylphenoxy)-2,3-epoxypropane.
Analysis:-
  Found: C, 52.8; H, 6.6; N, 10.6%
  Required for $C_{20}H_{28}N_4O_5.C_2H_2O_4.\frac{1}{2}H_2O$: C, 52.5; H, 6.2; N, 11.1%

The compounds of the invention exist on D- and L-optically-active isomeric forms, and the invention includes these forms as well as the racemic mixtures. The general methods starting from an epoxide or a propan-2-ol derivative may be used to prepare opticallyactive isomers by using the appropriate enantiomers as starting materials. Alternatively, the racemic product of any of the above methods may be resolved by well-known techniques, e.g. by fractional crystallisation of an acid addition salt formed with an optically-active acid.

Compounds of the invention in which $R^5$ is not the same as $R^6$ have two asymmetric centres and exist as two racemic pairs of diastereoisomers. In general, the products of each of the general methods described above, when $R^5$ is not the same as $R^6$, will be a mixture of the two pairs of stereoisomers, and these pairs may usually be separated from each other by physical methods, e.g. by fractional crystallisation or chromatography of the free bases or suitable salts. The invention includes the separated pairs, as well as mixtures thereof, as racemic mixtures or as separated D- and L- forms.

The activity of compounds of the invention as β-adrenergic blocking agents, and the degree of selectivity of their inhibitory action on myocardial β-receptors, i.e. those affecting heart tissue, compared with their action on peripheral β-receptors, e.g. those affecting tracheal or bronchial tissue or vascular tissue, have been shown by one or more of the following tests:

a. measuring and comparing inhibition of catecholamine induced changes in isolated guinea-pig atria and trachea;
b. measuring and comparing suppression of tachycardia and relaxation of the trachea induced by isoprenaline in the anaesthetised guinea-pig;
c. measuring suppression of the tachycardia induced by isoprenaline in the conscious dog; and
d. measuring and comparing suppression of the stimulating action of isoprenaline on the adenyl cyclase enzyme present in rat heart and lung tissue.

In test (a) the isolated guinea pig atria and trachea, in controlled physiological liquid environments, are stimulated electrically and the effects of adding increasing amounts of adrenaline to the liquid environment, on the rate and force of contraction of the atria; and of isoprenaline on the degree of relaxation of the trachea, are measured. The test compound is then added to the liquid environment at various concentrations and the effects of adding adrenaline and isoprenaline, respectively, are measured again. The concentrations of test compound which give 50% inhibition of the effects of adrenaline and isoprenaline are then calculated and taken as a measure of its activity in respect of myocardial and peripheral β-receptors, respectively.

In test (b), blood pressure, heart rate, and pressure within a segment of the trachea of a quinea-pig anaesthetised with sufficient pentobarbitone sodium to prevent spontaneous respiration, are measured while artificial respiration is maintained directly into the lung at a constant rate. isoprenaline at a standard dose of 0.5 microgramme is injected intravenously to induce tachycardia, cause relaxation of the trachea and lower blood prressure. The ability of the test compound to suppress the tachycardia and/or antagonise the relaxation of the trachea and/or the fall in blood pressure caused by the isoprenaline is then measured by injecting the test compound prior to isoprenaline.

In test (C), conscious dogs are dosed with the test compound intravenously (0.125 to 0.25 mg/kg) or orally (0.5 to 4 mg/kg), and the effect of an isoprenaline challenge on heart rate is measured. Heart rates are recorded before dosing and for 30 minutes after, and the dogs are then given a subcutaneous challenge of isoprenaline. The degree of isoprenaline-induced tachycardia is recorded at 15 minute intervals.

In test (d), homogenised rat heart in a standardised medium is incubated with adenosine-5'-triphosphoric acid (ATP) labelled with tritium, with and without isoprenaline, and the test compound is added at various concentrations to the homogenate with the isoprenaline. After incubation at 30°C., cyclic-3',5'-adenosine-monophosphoric acid (cyclic-AMP), containing a known proportion of carbon-14 labelled material, is added and synthesis of cyclic-AMP by the adenyl cyclase enzyme is stopped by raising the temperature. Cyclic-AMP is separated and purified, and the amount synthesised in each case by the enzyme is measured as its tritium to carbon-14 ratio. The concentration of test compound which gives a 50% inhibition of the stimulating effect of isoprenaline on cyclic-AMP synthesis is taken as a measure of its activity. In order to assess the degree of tissue selectivity of the agent, the procedure is repeated using homogenised rat lung, and the results compared with those for the homogenised rat heart.

The results of tests (a), (b) and (d) have shown that β-adrenergic blocking compounds with a higher degree of selectivity for heart tissue compared with lung tissue, i.e. which exert a stronger inhibitory effect on myocardial than on peripheral β-receptors, are those having the preferred structural features as hereinbefore indicated, and are specifically the compounds of Examples IV, VII, IX, XIII, XIV, XV, XVI, XXII and XXIII.

For administration to man in the treatment of cardiac conditions such as angina pectoris, it is expected that oral dosages of the most active compounds of the invention will be in the range from 0.5 to 10 mg/kg/day, given in 3 or 4 divided doses per day, and that dosages for intravenous administration will be about one-tenth of these in a single dose per day. Thus, for a typical adult patient (70 kg), individual tablets or capsules might contain from 10 to 250 mg of active compound, and intravenous dosages from 1 to 50 mg, in a suitable pharmaceutically-acceptable vehicle or carrier.

EXAMPLE XXIV

Formulation of tablets and capsules of 1-[2-(3-{4-acetamido-2-methylphenoxy}-2-hydroxy-propylamino)ethyl]thymine described in Example IV is effected using the following ingredients:

| TABLETS | mg./tablet |
|---|---|
| 1-[2-3-{4-acetamido-2-methylphenoxy}-2-hydroxypropylamino)ethyl]thymine | 120.0 |
| Dicalcium phosphate | 120.0 |
| Corn starch | 20.0 |
| Magnesium stearate | 1.6 |
| Sodium lauryl sulfate | 0.2 |

The ingredients are blended and compressed. The compressed pieces are then broken into granules and compressed into finished tablets.

| CAPSULES | mg./capsule |
|---|---|
| 1-[2-(3-{4-acetamido-2-methylphenoxy}-2-hydroxypropylamino)ethyl]thymine | 120.0 |
| Corn starch | 127.0 |
| Microcrystalline cellulose | 127.0 |
| Magnesium stearate | 5.4 |
| Sodium lauryl sulfate | 0.6 |

The ingredients are blended and filled into hard gelatin capsules of suitable size.

What we claim is:

1. A compound having the formula:

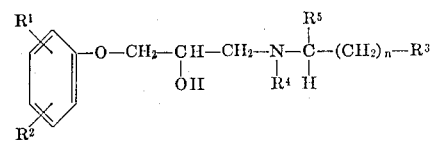

where R¹ is hydrogen or a lower alkanoyl amino;
R² is hydrogen or methyl;
R³ is an at least partially hydrogenated imidazoline or pyrimidine linked to the remainder of the molecule by one of its nitrogens and having a ring oxo or thio substitutent adjacent to that nitrogen and optionally a second oxo or thio substituent adjacent to a nitrogen and/or one or more lower alkyl substituents;
R⁴ is hydrogen, lower alkyl, lower alkanoyl or benzyl;

R⁵ is hydrogen or methyl;
and $n$ is 1 to 3;

2. A compound as claimed in claim 1 in which R¹ is hydrogen.
3. A compound as claimed in claim 1 in which R¹ is lower alkanoylamino.
4. A compound as claimed in claim 1 in which R⁵ is hydrogen.
5. A compound as claimed in claim 1 in which R⁵ is methyl.
6. A compound as claimed in claim 1 in which $n$ is 1.
7. A compound as claimed in claim 3 in which R¹ is acetamido.
8. A compound as claimed in claim 1 in which R² is hydrogen or 2-methyl.
9. A compound as claimed in claim 7 in which R² is hydrogen or 2-methyl.
10. A compound as claimed in claim 1 in which R³ is 1,2,3-4-tetrahydro-2,4-dioxo-pyrimidin-1-yl substituted at the 5-position with lower alkyl.

11. A compound as claimed in claim 10 in which lower alkyl is methyl.

12. 1-[2-(3-{4-acetamido-2-methylphenoxy}-2-hydroxypropylamino)-ethyl]thymine and its pharmaceutically-acceptable acid addition salts.

13. 1-[2-(3-{2-methylphenoxy}-2-hydroxypropylamino)ethyl]thymine and its pharmaceutically-acceptable acid addition salts.

14. 1-[2-(3-phenoxy-2-hydroxypropylamino)ethyl]thymine and its pharmaceutically-acceptable acid addition salts.

15. 5-Ethyl-1-[2-(3-{2-methylphenoxy}-2-hydroxypropylamino)ethyl]-uracil and its pharmaceutically-acceptable acid addition salts.

16. 5-Isopropyl-1-[2-(3-{-2-methylphenoxy}-2-hydroxpropylamino)-ethyl]uracil and its pharmaceutically-acceptable acid addition salts.

17. 5-Ethyl-1-[2-(3-{4-acetamido-2-methylphenoxy}-2-hydroxypropylamino)ethyl]uracil and its pharmaceutically-acceptable acid addition salts.

18. 5-Isopropyl-1-[2-(3-{4-acetamido-2-methylphenoxy}-2hydroxy-propylamino)ethyl]uracil and its pharmaceutically-acceptable acid addition salts.

19. 1-[2-(3-{2-methylphenoxy}-2-hydroxypropylamino)propyl]thymine and its pharmaceutically-acceptable acid addition salts.

20. 1-[2-(3-{4-acetamido-2-methylphenoxy}2-hydroxypropylamino)-propyl]thymine and its pharmaceutically-acceptable acid addition salts.

* * * * *